Figures 1, 2:
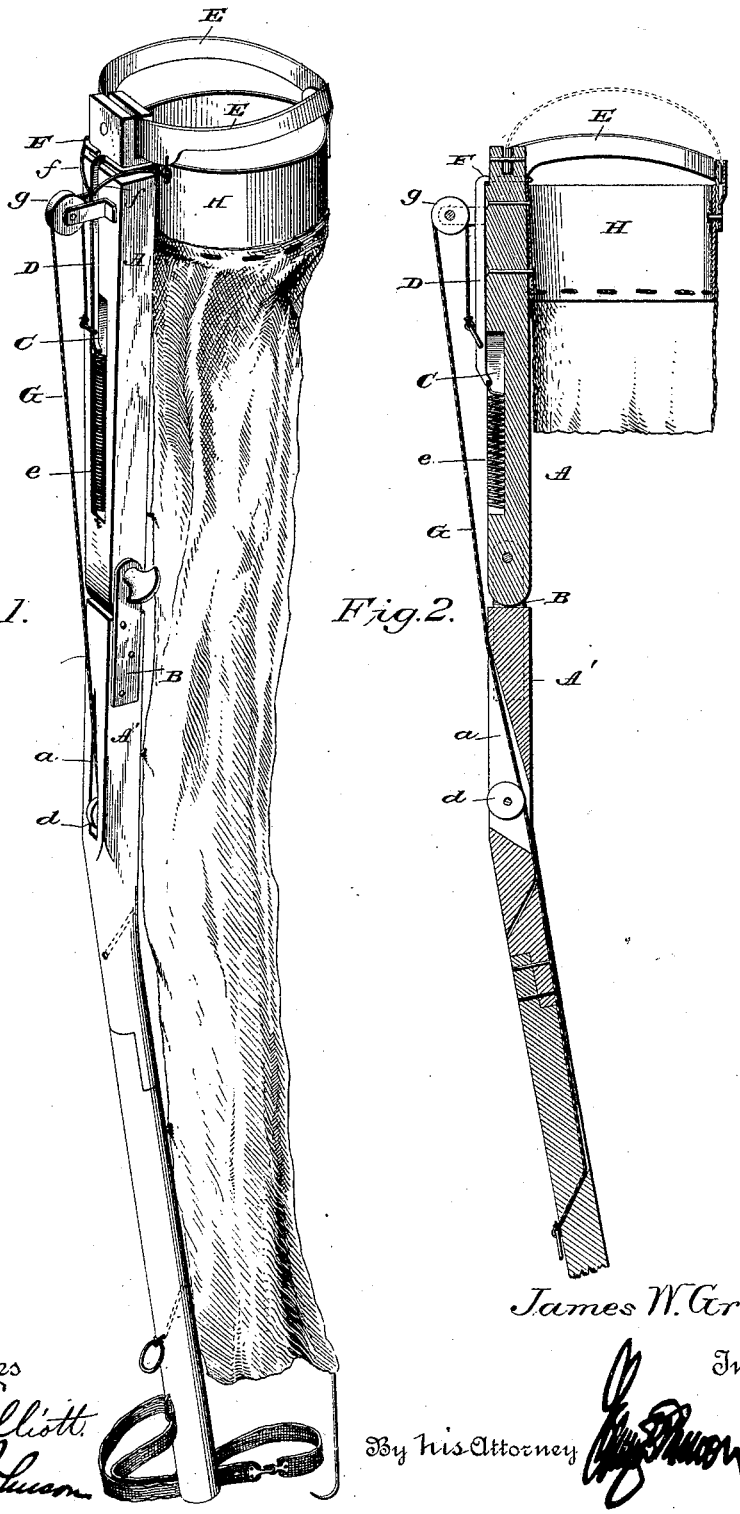

(No Model.)

J. W. GRAHAM.
FRUIT PICKER.

No. 424,880. Patented Apr. 1, 1890.

Witnesses
G. S. Elliott
E. W. Johnson

James W. Graham.
Inventor
By his Attorney

UNITED STATES PATENT OFFICE.

JAMES W. GRAHAM, OF EAST VIEW, KENTUCKY.

FRUIT-PICKER.

SPECIFICATION forming part of Letters Patent No. 424,880, dated April 1, 1890.

Application filed November 14, 1889. Serial No. 330,291. (No model.)

*To all whom it may concern:*

Be it known that I, JAMES W. GRAHAM, a citizen of the United States of America, residing at East View, in the county of Hardin and State of Kentucky, have invented certain new and useful Improvements in Fruit-Pickers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain new and useful improvements in fruit-pickers, which are designed to remove the fruit from the limb of a tree without injury to the same.

The object of my invention is to provide a simple, cheap, and convenient implement for the above purpose, which I do by means of the device described herein and illustrated in the accompanying drawings, in which—

Figure 1 is a perspective view of a fruit-picker constructed in accordance with my invention, and Fig. 2 is a sectional view.

A refers to the upper section of the handle, which is pivoted to the section A', the sections beneath being provided with means for extending the same, as is usual in this class of invention. The section A' has the upper portion thereof bent out of line with the lower portion, and it is provided centrally with a slot $a$, within which is journaled a grooved roller $d$, and the upper end of this section has rigidly secured thereto two extended straps B B, provided with perforations, one of which is screw-threaded for the reception of the threaded end of the bolt which pierces the section A, for pivotally connecting the same to the said section A', so that by turning the bolt in one direction the straps may be drawn together to clamp and retain in position the upper section, and when said bolt is loosened the section A of the handle may be adjusted to the desired angle.

The upper section A is provided on its rear face with a deep-seated recess C, within which is placed a spiral spring $e$, one end of which is secured within the recess by a hook or staple, while its other end is attached to the lower end of the follower D, which follower is made up of a bar of metal, the upper end of which is bent to form a rectangular portion F to embrace the upper reduced end of the section A. The section A is bifurcated to receive one end of each of the jaws E, which are pivoted therein by means of a pivot-bolt, the opposite ends of these jaws being pivoted to the mouth of the receiving pouch or bag.

To the follower is attached an operating-cord G, which passes up over a pulley $g$, supported in brackets above the follower, after which it passes through the slot $a$ and continues downward to be within easy reach of the operator.

The follower near its upper end carries two extended arms $f\ f$, the ends of which are formed into eyes, and connected with said eyes are chains or flexible connections for connecting said arms to the jaws E E.

A cylinder or rim H is rigidly connected to the section A of the handle, and is provided with plates between which the jaws are pivoted, so that they may overlap each other, said jaws having cutting-edges for severing the stems of the fruit. The lower edge of the cylinder is provided with perforations for securing the pouch or bag thereto, into which the fruit will pass from the cylinder. This bag is provided at its lower end with a hook or other equivalent, and the lower end of the handle has a strap designed to be passed over the right shoulder and under the left arm, which serves to support the weight of the implement. A basket may also be hung to said strap, and the hook at the bottom of the bag or pouch is hooked in the basket to retain the bag in position.

By providing the hereinbefore-described device with an adjustable upper section the angle of the severing-jaws and cylinder may be varied with respect to the handle, so that the fruit can be more easily reached. It will also be observed that the follower not only serves to close the jaws when operated in an opposite direction by the cord, but also automatically opens the jaws to release the stem of the fruit when pressure is removed from said cord.

It will be observed that in use the fruit cannot be injured and that the operative parts do not project to be in the way of leaves and small limbs.

Having thus described my invention, what I claim as new, and desire to secure by Letters Patent, is—

1. In a fruit-picker having a receiving-cylinder and flexible conduit or bag and severing-jaws, the latter being pivoted to the cylinder and upper end of the handle, a follower D, guided as described and having its upper end bent to form a horizontal loop embracing the pivotal portions of the jaws at one side, a retracting-spring connected to the lower end of the follower, a stirrup $f$, connected to said follower and to the jaws, and operating-cord for raising the follower, so that its loop will contract the pivotal portions of the jaws, and upon the release of the cord the spring will retract the follower and its stirrup to open the jaws, substantially as set forth.

2. In combination with a fruit-picker constructed substantially as shown, of a handle having an adjustable section A, a bent section A', to which the section A is pivotally secured, a spring-actuated follower having a stirrup and operating-cord and guide-pulleys therefor, substantially as shown, and for the purpose set forth.

3. In a fruit-picker, the combination of the handle comprising two sections A A', adjustably connected, a cylinder and conduit or bag, the jaws E E, having tapering ends overlapping and pivoted, as described, a follower D, having a horizontal loop embracing said pivotal portions, a contracting-spring connected to the lower end of the follower, a stirrup $f$, connected to the follower and to the jaws, together with a cord for raising said follower to contract the jaws, the latter being opened by the spring through the follower and stirrup-connections, substantially as set forth.

In testimony whereof I affix my signature in presence of two witnesses.

JAMES W. GRAHAM.

Witnesses:
KITTIE HOOVES,
CLARA PAYNE.